United States Patent [19]
Kamman

[11] 3,889,934
[45] June 17, 1975

[54] HYDRAULIC BUFFER

[75] Inventor: Gordon W. Kamman, Elma, N.Y.

[73] Assignee: Houdaille Industries, Inc., Buffalo, N.Y.

[22] Filed: Dec. 19, 1973

[21] Appl. No.: 426,233

[52] U.S. Cl. .................. 267/34; 188/287; 188/322
[51] Int. Cl. ........................................... B60g 11/56
[58] Field of Search .......... 188/322, 287, 315, 316; 267/34; 213/43

[56] References Cited
UNITED STATES PATENTS

| | | | |
|---|---|---|---|
| 2,744,587 | 5/1956 | Beck .............................. | 188/287 X |
| 3,207,270 | 9/1965 | Ellis, Jr. ............................ | 188/287 |
| 3,419,114 | 12/1968 | Rumsey ........................ | 188/287 X |
| 3,425,522 | 2/1969 | Gryglas ........................ | 188/322 X |
| 3,510,117 | 5/1970 | Scholin et al. ................ | 188/287 X |
| 3,645,365 | 2/1972 | Domek ......................... | 188/287 X |
| 3,666,256 | 5/1972 | Ellis et al. ....................... | 188/322 X |

FOREIGN PATENTS OR APPLICATIONS
100,153  1/1962  Netherlands ........................ 213/43

Primary Examiner—George E. A. Halvosa
Attorney, Agent, or Firm—Hill, Gross, Simpson, Van Santen, Steadman, Chiara & Simpson

[57] ABSTRACT

A hydraulic buffer especially suitable for heavy duty uses has a minimum number of rugged parts including a metering orifice cylinder closed at one end and enclosed within a housing providing a hydraulic fluid reservoir, with a piston reciprocable in fluid displacing relation within the cylinder and having a hollow piston within which is received a coil spring seated on the cylinder end closure and normally biasing the piston and rod into protracted relation relative to the housing to receive force to be damped against the head of the piston rod. A piston ring serves as a check valve controlling displacement ports through the piston.

1 Claim, 3 Drawing Figures

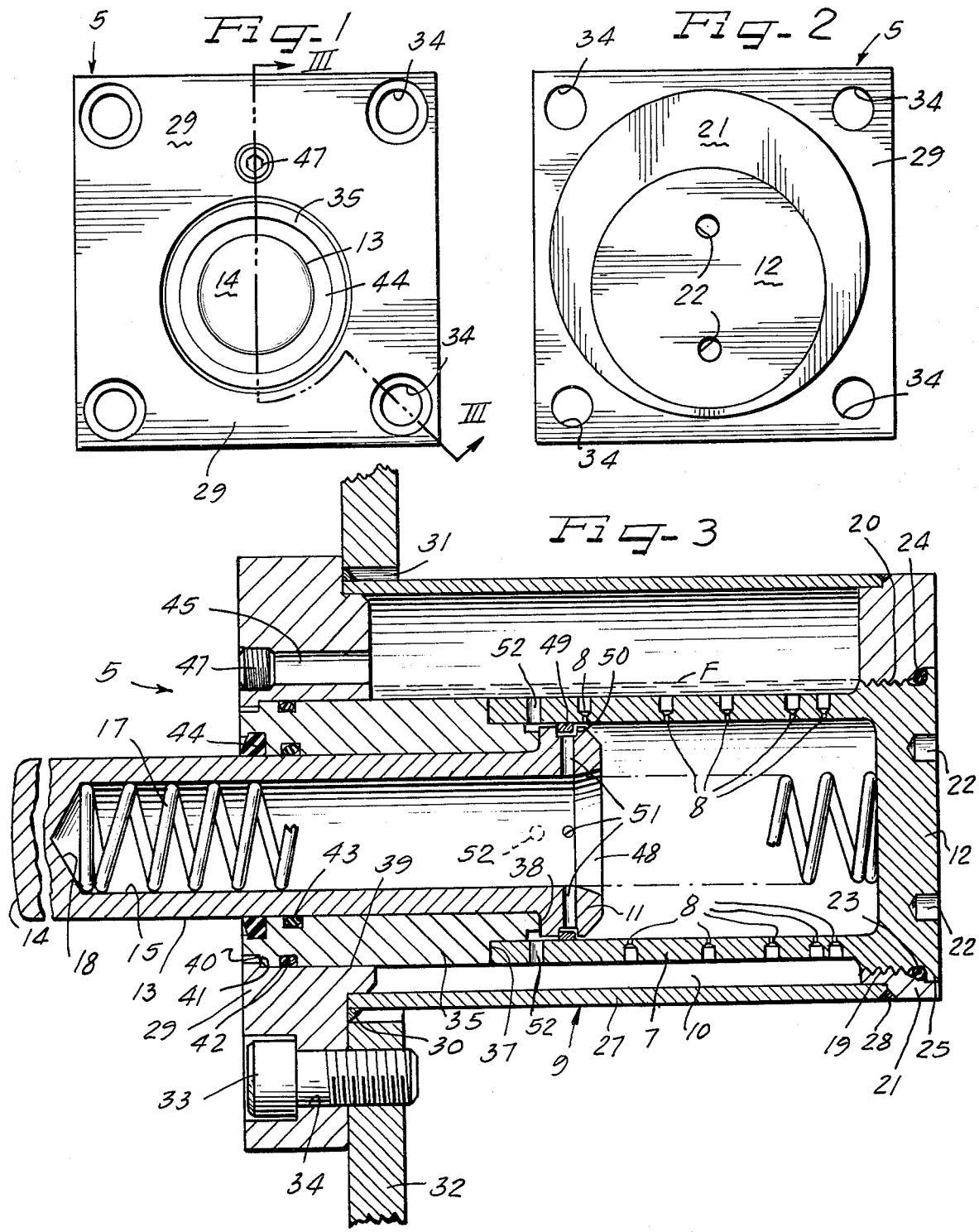

3,889,934

1
HYDRAULIC BUFFER

This invention relates to hydraulic buffers and is particularly concerned with such buffers especially suitable for heavy duty uses.

Damping of energy generated by heavy moving equipment presents special problems of structural and mechanical viability of damping apparatus. Where such damping must be effected on or in association with earth moving apparatus the problem is further complicated by dirt and grit contamination. Prior damping devices, and more particularly buffers have sometimes lacked ruggedness to withstand high energy impacts. Some prior devices have been excessively bulky in attempts to meet the requirements for ruggedness. Other devices intended for this general purpose have been costly to manufacture for various reasons such as large number and complexity of parts. To effect the actual damping, that is absorbtion of energy, prior devices have generally relied upon fairly elaborate valving and control mechanisms and numerous moving parts liable to wear and failure.

An important object of the present invention is to overcome the foregoing and other disadvantages, deficiencies, inefficiencies, shortcomings and problems encountered in respect to prior hydraulic buffers, and to attain important improvements and advantages in the construction and operation of hydraulic buffers especially suitable for heavy duty uses.

Another object of the invention is to provide a hydraulic buffer which is advantageously compact, rugged, durable in structure and efficient and reliable in operation.

A further object of the invention is to provide a new and improved hydraulic buffer having a novel, simple and positively functioning energy absorbing and deceleration and return system.

Still another object of the invention is to provide a new and improved hydraulic buffer especially suitable for heavy duty use such as on earth moving machinery for buffing and decelerating heavy moving parts of the machinery.

Other objects, features and advantages of the invention will be readily apparent from the following description of a preferred embodiment thereof, taken in conjunction with the accompanying drawing although variations and modifications may be effected without departing from the spirit and scope of the novel concepts embodied in the disclosure, and in which:

FIG. 1 is a front end elevational view of a buffer embodying features of the invention;

FIG. 2 is a rear end elevational view of the buffer; and

FIG. 3 is an enlarged sectional detail view taken substantially along the line III—III of FIG. 1.

By way of illustration, a hydraulic buffer 5 having features of the invention comprises a few and simple, rugged, efficiently functioning parts especially equipping the buffer for heavy duty uses such as in damping and decelerating high energy movable apparatus parts. One such use for which the buffer 5 is particularly adapted is in decelerating and stopping swinging of a boom or arm in earth moving machinery, and more particularly the swing arm of a backhoe, should such arm be permitted to approach the body or frame of the apparatus with potentially damaging impact. To this end, the buffer 5 includes a cylinder 7 having longitudinally spaced metering orifices 8, with means providing a housing 9 enclosing the cylinder and including a hydraulic fluid reservoir 10 communicating with the orifices 8. A piston 11 reciprocable in the cylinder 7 displaces hydraulic fluid through the orifices 8. A closure 12 across one end of the cylinder opposes an inner end of the piston 11, while a hollow piston rod 13 projects from the piston 11 through the opposite end of the cylinder 7 and has a force-receiving head 14. Within the piston rod 13 is a blind end bore 15 which opens through the inner end of the piston 11. Extending into the bore 15 is a coiled compression spring 17 thrusting against a blind end 18 within the bore, in this instance adjacent to but adequately spaced from the outer end of the head 14. At its opposite end, the spring 17 seats on the end closure 12 and thereby biases the piston 11 and the piston rod 13 normally into protracted relation to the cylinder 7 and with the piston in substantially spaced relation to the closure 12. Retraction movement of the piston 11 and the rod 13 in response to sufficient force applied through the head 14 is permitted by overcoming of the bias of the spring 17 to compress it and by overcoming resistance of hydraulic fluid within the cylinder 17 and displacing of the fluid with energy absorbing effect through the orifices 8.

In a preferred construction, the cylinder 7 and the end closure 12 are formed in one piece and with the end closure 12 of substantial, rugged thickness to withstand full thrust of impact pressure thereagainst not only of the spring 17, but also hydraulic fluid within the working chamber defined by the cylinder 17, and also direct thrust of the piston 11 against the closures 12 serving as a stop at the inner limit of movement of the piston 11 toward the end closure 12, being noted that in a preferred construction the space between the inner end of the piston 11 and the stop surface provided by the end closure 12 is somewhat less than the length of the piston rod 13 beyond the housing 9 in the protracted position of the piston rod.

To facilitate assembly of the end closure 12 and the cylinder 7 with the housing 9, the end closure is constructed of circular disk form slightly larger in diameter than the outside diameter of the cylinder 7 and provided with suitable threads 19 by which the end closure 12 is adapted to be and is threadedly secured in a tapped bore 20 in a reservoir end closure plate 21 of the housing 9. Spanner wrench sockets 22 are desirably provided in the outer end of the end closure 12 to facilitate threadedly securing the same into the bore 20. A leakproof joint is provided at the interconnection between the end closure 12 and the closure plate 21 by means of a resilient sealing ring clamped against a shoulder 24 on the plate member 21 facing toward a seal compressing annular lip flange provided about the outer end of the end closure 12. Completing the reservoir housing 9 is a housing tube 27 seated on and secured hermetically as by means of welding 28 to the closure plate 21 and extending therefrom to a greater length than the cylinder 7 into seated engagement at its opposite end with a rugged plate 29 to which the housing tube is hermetically secured as by means of welding 30. It may be observed that the mounting plate 29 is of angular, in this instance square configuration in plan such that with the housing tube 27 concentric therewith and extending inwardly through a cylindrical clearance aperture 31 in a frame member or plate 32 of associated apparatus, the mounting plate 29 will bridge the opening 31 so that screws 33 can secure the mounting plate to the supporting member 32 at corners of the mounting plate which are provided for this purpose with countersunk screw holes 34 through the corner areas of the mounting plate. Means providing a connection between the cylinder 7 and the mounting plate 29 and serving as a protraction limiting stop for the piston 11 and a guide for the piston rod 13 comprise a sleeve member 35 which is of at least about the same outside diameter as the outside diameter of the cylinder 7 but of an inside diameter to be in sliding engagement with the piston rod 13 which is of smaller diameter than the piston 11. For concentric engagement of the cylinder 7 with the sleeve 35 a rabbet groove 37 in the inner end of the sleeve 35 opens through the outside diameter of the sleeve and the inner free end of the cylinder 7 is telescopically seated therein. At this end, the sleeve 35 provides a stop shoulder 38 facing toward and engagable by the piston 11.

At its opposite or outer end portion, the sleeve 35 is received in a bore 39 in the mounting plate 29, with an annular outwardly facing shoulder 40 on the sleeve abutting an inwardly facing shoulder 41 on the mounting plate 29 about the outer end of the bore 39. This retains the sleeve 35 against outward escape relative to the mounting plate 29 while the cylinder 7 engaging the inner end portion of the sleeve holds it firmly against inward displacement after the subassembly of the cylinder 7, the sleeve 35, and the piston 11 and rod 13 as a plunger unit, has been inserted into assembly within the housing 9 through the bore 20. Leakage through the joint between the sleeve 35 and the mounting plate 29 is prevented by a static seal 42. Leakage through the sleeve 35 past the piston rod 13 is prevented by a dynamic seal 43. Contaminants are prevented from being carried inwardly by the outwardly projecting portion of the piston rod 13 during its retractional movements by means comprising a suitable wiper packing ring 44 at the outer end of the piston rod guide bore in the sleeve 35.

To provide not only an efficient relationship of the reservoir 10 about the cylinder 7 but also to provide for ample space within the confines of the reservoir for piston rod displacement and temperature variations in the hydraulic fluid within the reservoir, the cylinder 7 and the sleeve 35 with the piston therein are located eccentrically in the lower portion of the reservoir 10 when the buffer 5 is mounted on a horizontal axis as shown in FIGS. 2 and 3. This is accomplished by having the bores 20 and 39 on a common eccentric axis relative to the closure plate 21 and the mounting plate 29, respectively. Thereby, positioning the buffer 5 horizontally and with the cylinder 7 in the lower portion of the reservoir 10 provides a larger space in the upper portion of the reservoir 10 as best seen in FIG. 3 such that the entire cylinder 7 can at all times be fully immersed in the hydraulic fluid within the reservoir 10 and well below an upper level of the fluid as identified at F, with the space thereabove serving as an expansion space normally filled with air or any preferred gas. Filling of the reservoir 10 with the preferred volume of hydraulic fluid such as oil of suitable grade is effected through filler means comprising a filler opening or port 45 through that area of the mounting plate 29 which is located at the widest area of the mounting plate relative to the position of the sleeve 35 and the bore 39 and generally in line with the expansion space within the reservoir 10. After filling, the filler opening 45 is closed by a plug 47.

In operation of the buffer 5, reliance upon the spring 17 to resist impact stroke or retractional movement of the piston 11 and piston rod 13 as a plunger unit is a minor factor, while major reliance for resistance to such stroke is on controlled hydraulic fluid displacement through the metering orifices 8. The number, size and relative positions of the orifices 8 is predetermined to provide a desired resistance or internal pressure at any impact stroke of the piston 11, and more particularly as the inertia energy of the object impacting the plunger head 14 is absorbed by the buffer 5, the speed of the piston 11 is reduced until at the end of its retractional stroke its velocity is brought to zero, and all energy applied to the piston plunger is dissipated by the hydraulic fluid forced through the orifices 8. Immediately upon release of inward pressure on the piston plunger, it is returned to its normal protracted position by the biasing spring 17. To facilitate mounting and action of the spring 17, it is of a diameter to be in fairly close but free slidable engagement within the bore 15 and will thus be free from any tendency to sag or misalign from its coaxial relation to the piston 11 in fully expanded condition and more particularly in that portion of the spring which projects from the end of the piston 11 into seating engagement with the end closure 12, even though there is no guide projection or stud within the inner end coil of the spring. Further, at the mouth of the bore 15, a flaired leadin surface 48 eases reception of the inner coils of the spring in the bore as the piston plunger is driven inwardly.

Excellent results are obtained for heavy duty purposes, such, for example, as where the buffer 5 is employed to control the terminal swing motion of the swing arm of a backhoe, where the housing 9 is on the order of about 6 to 7 inches in length and 4 inches in diameter, with the mounting plate 29 about 5½ inches square, the piston 11 about 2 inches in diameter, the total length of the piston plunger including the piston rod 13 on the order of 6¼ inches, and other dimensions generally proportionate as shown. In this arrangement a piston stroke of about 2½ inches will serve the purpose where the orifices 8 are disposed in two staggered series of five orifices each, with the respective series of orifices located at diametrically opposite sides of the cylinder 7. In such an arrangement the orifices may be uniformly of about 0.028 inch in diameter and thus capable of being drilled with a No. 70 drill. It will be understood, of course, that all of the dimensions given are merely exemplary as related to the illustrated embodiment of the invention, and are subject to suitable variation to meet other specific uses than for decelerating and stopping terminal swing motion of a backhoe swing arm. As shown, the orifices 8 as staggered in the two complementary rows may be, and at least most of them are, of progressively diminishing spaced relation longitudinally of the cylinder 7, starting with the orifice in each instance which is nearest the piston 11 in its protracted position, and in closest spaced relation adjacent to the end closure 12. In addition, the orifice 8 which is closest to the end closure 12 is sufficiently spaced therefrom to be fully closed off by the piston 11 before the piston strikes the end closure 12, thus assuring zero deceleration at the end of buffing stroke of the piston 11.

To provide for positive orifice control damping and deceleration during the buffing stroke of the piston 11, but rapid return to initial starting position under spring bias, the piston 11 is equipped with check valve means comprising a piston ring 49 engaged loosely in a peripheral groove 50 in the piston 11 of slightly greater width and depth them the axial width and inside diameter of the ring 49. While the piston ring 49 engages the wall within the cylinder 7, the perimeter of the piston 11 is of slightly smaller differential diameter to remain in uniformly spaced relation to the cylinder wall. Uniformity of such spaced relation is assured by the elongated guide provided by the sleeve 35. Desirably the check valve ring 49 is of the split ring type so that it can be expanded and moved into assembly within the groove 50 before the piston 11 is assembled within the cylinder 7.

During buffing stroke of the piston 11, the check valve ring 49 engages the inwardly advancing side wall of the groove 50, that is the side wall which is nearest the piston rod 13. At the beginning of the buffing stroke such engagement results from normal frictional engagement of the ring with the cylinder wall. As a result, the ring 49 seals the gap between the piston 11 and the cylinder wall against escape of hydraulic fluid from in front of the piston toward the back of the piston and places the piston under the full metered hydraulic fluid resistance to buffing stroke movement. Such sealing effect of the ring 49 is enhanced by hydraulic pressure acting against its advancing side which during the buffing stroke is exposed to the hydraulic pressure forwardly of the piston and thus holds the ring in positive checking relation to the advancing side of the groove 50. In addition, hydraulic fluid pressure acting on the inner diameter of the ring 49 forces it into firm sealing engagement with the wall of the cylinder. Further assurance of thorough sealing engagement of the ring 49 with the cylinder wall is provided by communication between the interior of the cylinder and the inside diameter of the ring 49 through radial ports 51 in the piston 11 aligned with the groove 50 and opening from the bore 15. Therefore as the piston 11 advances in the buffing stroke hydraulic pressure within the cylinder 7 will be communicated through the inner diameter of the ring 49 and positively thrust it into firm sealing engagement with the cylinder wall. During the buffing stroke hydraulic fluid passes relatively freely to the back of the piston 11 from the reservoir 10 through a plurality, herein four radial pressure relief ports 52 generally aligned with the stop shoulder 38.

At termination of the buffing stroke of the piston 11, whether full or partial, the return biasing force of the spring 17 drives the piston in return direction relative to the check valve ring 49 now relieved of hydraulic pressure from within the cylinder 7 but nevertheless frictionally engaging the cylinder wall. Thereby the outer side of the groove 50 moves away from the ring 49 and opens a passage past such side wall and the perimeter of the piston 11 to effect anticavitation communication between the ports 51 and the area back of the piston 11, and the ports 52, so that the area of the cylinder 7 in front of the returning piston 11 will be relieved rapidly from drag as compared to metered hydraulic fluid return only through the orifices 8. Generally it is desirable to effect rapid recycling return of the piston 11 where heavy machinery components are buffed, so that the piston is immediately reconditioned for buffing stroke action.

It will be understood that variations and modifications may be effected without departing from the spirit and scope of the novel concepts of this invention.

I claim as my invention:

1. A hydraulic buffer especially suitable for heavy duty uses, comprising:

a tubular housing defining a hydraulic fluid reservoir and having permanently attached opposite end closures of substantial thickness provided with concentric respective openings and with the opening in one of said closures being of larger diameter than the opening in the other of said closures;

said other closure having adjacent to the outer end of its opening an inwardly facing integral shoulder;

a tubular piston rod guide member having an end portion engaged in said other closure opening with an outwardly facing shoulder engaging said inwardly facing shoulder and said tubular member projecting inwardly from said other closure;

said tubular member having an inner end portion shoulder facing inwardly;

a one-piece generally cup-shaped combination cylinder and integral end closure having an inner end engaging said inner end portion shoulder of said member and having external threads on the periphery of said integral end closure threadedly engaging threads on said one end closure within said larger opening and by means of the thread engagement thrusting the inner end of the cylinder against the inwardly facing shoulder on said tubular member and thereby thrusting said outwardly facing shoulder on the tubular member against said inwardly facing shoulder of the other closure;

a piston reciprocably movable in said cylinder between the inner end of said tubular member and said integral cylinder end closure and having a piston rod slideably engaged in said tubular member and projecting substantially outwardly therefrom;

said piston and piston rod having a blind end bore opening inwardly and having a coiled compression biasing spring extending from the bore and seated on said integral cylinder end closure for normally biasing the piston outwardly into stopped engagement against said inner end of the tubular member;

said cylinder having a longitudinal series of metering orifices therethrough communicating the cylinder with the reservoir defined by said housing;

said piston being of smaller diameter than the surrounding wall of the cylinder and having an annular peripheral groove opening toward the cylinder wall;

a check valve ring mounted in said groove and having an outside diameter to engage in slideable sealing relation with the cylinder wall, the ring being narrower than the width of said groove;

ports in said piston effecting communication between said bore and said groove;

relief port means through said cylinder outwardly relative to the inner end of said tubular member and effecting communication between said reservoir and the cylinder at the side of said piston adjacent the tubular member; and said check valve ring acting within said groove to block communication between said ports and said outer side of the piston during inward compression stroke movement of the piston, and the ring displacing to the opposite side of the groove and opening communication between the ports and said outer side of the piston when the piston moves outwardly in a return stroke.

* * * * *